United States Patent [19]

Mehra-Palta et al.

[11] 4,377,921

[45] Mar. 29, 1983

[54] METHOD FOR THE IN SITU ACTIVATION OF THE NEEDLE FASCICLES OF GYMNOSPERMS AND FOR THE CLONAL PROPAGATION OF GYMNOSPERMS AND THE CLONES PRODUCED THEREBY

[75] Inventors: Asha Mehra-Palta, Monsey; Thomas E. Amidon, New Windsor, both of N.Y.

[73] Assignee: International Paper Company, New York, N.Y.

[21] Appl. No.: 289,121

[22] Filed: Aug. 3, 1981

[51] Int. Cl.³ .............................................. A01G 1/00
[52] U.S. Cl. ........................................ 47/58; 47/57.5
[58] Field of Search ............................................ 47/58

[56] References Cited

U.S. PATENT DOCUMENTS 2,204,214 11/1940 Grace .
2,274,989 3/1942 McKee .
4,152,869 5/1979 Jones .
4,199,897 4/1980 Greenwood .
4,217,730 8/1980 Abo El-Nil ............................ 47/58

OTHER PUBLICATIONS

Bot. Gaz. 138, 298–304, (1977), Coleman, W. K. and Thorpe, T. A.
Can. J. Bot. 47, 687–699, (1969), Girouard, R. M.
Physiol. Plant. 15:473–497, (1962) Murashige and Skoog.
Physiol. Plant. 22, 649–652, (1969), Basu, R. N. et al.
Planta 107:161, (1972), Gresshof, P. M. and Doy, C. H.
Proc. 15th Easter School in Agricultural Sciences, Univ. of Nottingham, Plenam Press, (1968), Hess, C. E. In. W.7 Whittington (ed.).
USDA Forest Service Research Note 80 (1968), Hoff, R. J. and McDonald, G. I.
Forest Sci., 15, pp. 64–65, (1969), Larsen, F. E. and Dingle, R. W.
Silvae Genet., 13, pp. 133–139, (1964), Mergen, F. and Simpson, B. A.
J. Forestry, 63, pp. 544–546, (1965), Hare, R. C.
Ber. Dtsch. Bot. Ges., 76, pp. 189–196, (1963), Kummerov, J. and Hoffman, C. A.
Idia Supl. For. 3, pp. 49–53, (1966), Concha, M. M. and Montaldi, E. R.
Physiol. Plant., 35, pp. 66–71, (1975), Whitehill, S. J. and Schwabe, W. W.
J. Amer. Soc. Hort. Sci., 100, pp. 404–406, (1975), Cohen, M. A. and Shanks, J.
J. Amer. Soc. Hort. Sci., 103, pp. 483–484, (1978), Cohen, M. A.
XIII Southern Forest Tree Improvement Conference, Raleigh, N.C., pp. 226–229, (1975), Hare, R. C.

Primary Examiner—Robert E. Bagwill
Attorney, Agent, or Firm—James F. Haley, Jr.

[57] ABSTRACT

A method for the in situ activation of the normally dormant needle fascicles of gymnosperms and the clonal propagation of gymnosperms and the clones produced thereby. The method for the in situ activation of the needle fascicles of gymnosperms to produce shoots comprising the step of contacting the terminal portion of a stem of the gymnosperm with between about 0.01 to 20 mg of a cytokinin. And, the method for the clonal propagation of gymnosperms and the production of clones thereof comprising the steps of contacting the terminal portion of a stem of the gymnosperm with between about 0.01 to 20 mg of a cytokinin; allowing the shoots to elongate; excising the elongated shoots from the stem and rooting the excised shoots.

21 Claims, 5 Drawing Figures

DETOPPING

DETOPPING

INJECTING

DRENCHING 2-4 WEEKS

2 MONTHS 4,377,921

METHOD FOR THE IN SITU ACTIVATION OF THE NEEDLE FASCICLES OF GYMNOSPERMS AND FOR THE CLONAL PROPAGATION OF GYMNOSPERMS AND THE CLONES PRODUCED THEREBY

BACKGROUND OF THE INVENTION

This invention relates generally to the asexual or clonal propagation of superior strains of forest trees. More particularly, it relates to a process for the in situ activation of the normally dormant needle fascicles of gymnosperms and for the clonal propagation of superior strains of gymnosperms, especially the various conifers, including species of the genus pinus, and the clones produced thereby.

For many years land managers within the forest products industry have been reforesting cut-over land in order to produce new crops of timber or pulp wood trees. Initially, reforesting was done naturally—by leaving individual mature trees or blocks of trees on the cut-over land to provide a natural seed source for future generations. It is plain that this technique of natural reseeding left much to chance—e.g., the production of acceptable seed crops by many species of gymnosperms occurs only infrequently.

A preferred method of reforesting is the planting of seedlings grown in nurseries. However, this method is beset by several disadvantages. For example, if wild seeds are relied on for the production of seedlings, they must be collected in the years of good seed crops. In addition, since the wild seeds originate from a large and varied genetic pool, the seedlings are likely to be of uneven quality, particularly in the important commercial characteristics of growth rate and wood or pulp production. To avoid this problem, selected trees, having desired growth rates and product characteristics, were chosen as seed sources for nursery-grown seedlings. However, genetic improvement of tree species using this practice is very slow—it may take 15–50 years for a new generation of trees to produce seeds of its own.

Since the object of any forest tree breeding program is to be able to supply genetically superior seedlings by the hundreds of millions in the shortest time possible, it is critical to reduce the generation time of stock in the breeding program.

One method to reduce the generation time of tree stock is described in U.S. Pat. No. 4,199,897. There, juvenile phase forest species within the genus pinus are treated by varying the growth conditions so as to induce flowering and hence seed production earlier in the species growth cycle. Such process is stated to permit collection of seeds as much as 10–15 years earlier in the growth cycle.

A second method to reduce the generation time of tree stock is the clonal propagation of the stock. In this general method, tree stock is reproduced asexually so that the time of flowering and seed production are less important. Several techniques for the clonal propagation of various species of gymnosperms exist. These include grafting, tissue culture and the rooting of cuttings. Grafting is labor intensive and is disadvantaged by graft (stock-scion) incompatibility problems. It is, therefore, commercially difficult. Tissue culture techniques, such as those described in U.S. Pat. No. 4,217,730, are beset by a number of problems including growth difficulties and the expense and trouble associated with the various culture steps. The rooting of cuttings, including needle fascicles (dwarf shoots), as described in e.g. [R. J. Hoff and G. I. McDonald, *USDA Forest Service Research Note* 80 (1968); F. E. Larsen and R. W. Dingle, *Forest Sci.*, 15, pp. 64–65 (1969)], is disadvantaged because the percentage of success is usually very low—the cutting or bud is more often than not unable to grow into a shoot. Furthermore, only one plantlet/branch can be obtained by rooting cuttings.

Several attempts have been made in the prior art to improve the percentage of success in the rooting of needle fascicles. For example, the pruning of terminal buds from long shoots has been shown to stimulate shoot development of needle fascicles [R. J. Hoff and G. I. MacDonald, supra; F. E. Larsen and R. W. Dingle, supra; F. Mergen and B. A. Simpson, *Silvae Genet.*, 13, pp. 133–39 (1964); R. C. Hare, *J. Forestry*, 63, pp. 544–46 (1965)]. Needle fascicles have also been activated to form shoots by foliar sprays of kinetin in *Pinus radiata* [J. Kummerov and C. A. Hoffman, *Ber. Dtsch. Bot. Ges.*, 76, pp. 189–96 (1963)] and 6-benzylaminopurine ("BAP") in *Pinus elliotti* [M. M. Concha and E. R. Montaldi, *Idia Supl. For.* 3, pp. 49–53 (1966)], *Pinus sylvestris* [S. J. Whitehill and W. W. Schwabe, *Physiol. Plant.*, 35, pp. 66–71 (1975)], *Pinus ponderosa* and *Pinus strobus* [M. A. Cohen and J. Shanks, *J. Amer. Soc. Hort. Sci.*, 100, pp. 404–06 (1975); M. A. Cohen, *J. Amer. Soc. Hort. Sci.*, 103, pp. 483–84 (1978)]. However, in each of these cases large volumes of cytokinin solutions were required to be used in the foliar sprays and a limited number of needle fascicle shoots actually were induced. For example, a foliar spray consisting of 50 ml (or more) of a 500 to 1000 mg/l BAP solution (25 to 50 mg BAP) was used every four to five days for a period of 30 days by M. M. Cohen and J. Shanks, supra, and S. J. Whitehill and W. W. Schwabe, supra. In addition, the time period required after treatment with such foliar sprays for shoot elongation before rooting ranged from 6 to 12 months and the rooting frequency of these shoots was low. Therefore, the clonal propagation of tree stock by the rooting of needle fascicles is still not commercially attractive.

SUMMARY OF THE INVENTION

The present invention generally solves the problems referred to above in activating needle fascicles and clonally propagating gymnosperms by providing a process by which a large number of shoots can be activated from normally-dormant needle fascicles. In addition, this process requires only small amounts of cytokinin and provides shoots that elongate rapidly so that rooting made be had within two to three months of treatment.

Therefore, in accordance with this invention, we provide a process for the in situ activation of normally dormant needle fascicles of gymnosperms and provides shoots that rapidly elongate.

In accordance with this invention, we also provide a process for the clonal propagation of gymnosperms that requires only a small amount of cytokinin, results in a large number of shoots from needle fascicles and provides shoots that elongate rapidly so that rooting made be had within two to three months.

Finally, we provide, in accordance with this invention, clones of superior strains of gymnosperms that may be rooted and used as seedlings to reforest cut over land.

More particularly, by virtue of this invention, we provide a process for the in situ activation of needle fascicles of gymnosperms to produce shoots comprising the step of contacting the terminal portion of a stem of such gymnosperm with 0.01 to 20 mg of a cytokinin. Moreover, we provide a cloning process wherein needle fascicles are activated, the activated needle fascicles and shoots are excised from the tree stock and rooted to produce clones of superior tree strains for reforesting cut over land.

These and other objects of this invention will become apparent from the following detailed description of this invention.

DETAILED DESCRIPTION OF THE INVENTION

In order that this invention may be more fully understood, the following detailed description is set forth.

In this description the following terms are employed:

Cytokinins-Plant hormones that affect the organization of dividing cells and their function in the transmission of information from DNA for protein formation. They include 6-benzylaminopurine (BAP), kinetin (K) and 6-$\gamma$,$\gamma$-dimethylallylaminopurine (2ip).

Auxins-Plant hormones that promote cell division and growth. They include ammonium $\beta$-indolylbutyrate, ammonium $\beta$-indolyl acetate and $\alpha$-naphthalene acetic acid (NAA).

Gibberellins-Plant hormones that affect growth patterns and floral production. They include gibberellic acid ($GA_3$) and others such as $GA_4$, $GA_7$ and mixtures thereof.

This invention is characterized by a process for the clonal propagation of gymnosperms that requires a small amount of cytokinin, results in a large number of shoots from needle fascicles and provides shoots that elongate rapidly so that rooting may be had within two to three months.

This invention is generally applicable to all gymnosperms—the so-called softwoods—which comprise the great bulk of the commercially important tree species useful for lumber. These include for example the pines: loblolly pine (*Pinus taeda*), slash pine (*Pinus elliotii*), longleaf pine (*Pinus palustris*), shortleaf pine (*Pinus echinata*), ponderosa pine (*Pinus ponderosa*), red pine (*Pinus resinosa*), jack pine (*Pinus banksiana*), Eastern white pine (*Pinus strobus*), Western white pine (*Pinus monticola*), sugar pine (*Pinus lambertiana*), lodgepole pine (*Pinus contorta*); Douglas-fir (*Pseudotsuga menziesii*); hemlock (*Tsuga canadensis*); Sitka spruce (*Picea glauca*); redwood (*Sequoia sempervirens*); the true firs including silver fir (*Abies amabilis*), grand fir (*Abies grandis*), noble fir (*Abies procera*), white fir (*Abies concolor*), balsam fir (*Abies balsamea*); and the cedars which include Western red cedar (*Thuja plicata*), incense cedar (*Libocedrus decurrens*), Port Orford cedar (*Chamaecyparis lawsoniana*), and Alaska yellow-cedar (*Chamaecyparis nootkatensis*), and larches such as Western larch (*Laryx occidentalis*). Most preferably, the invention is employed with species of the genus Pinus, especially loblolly pine.

Figure 1:
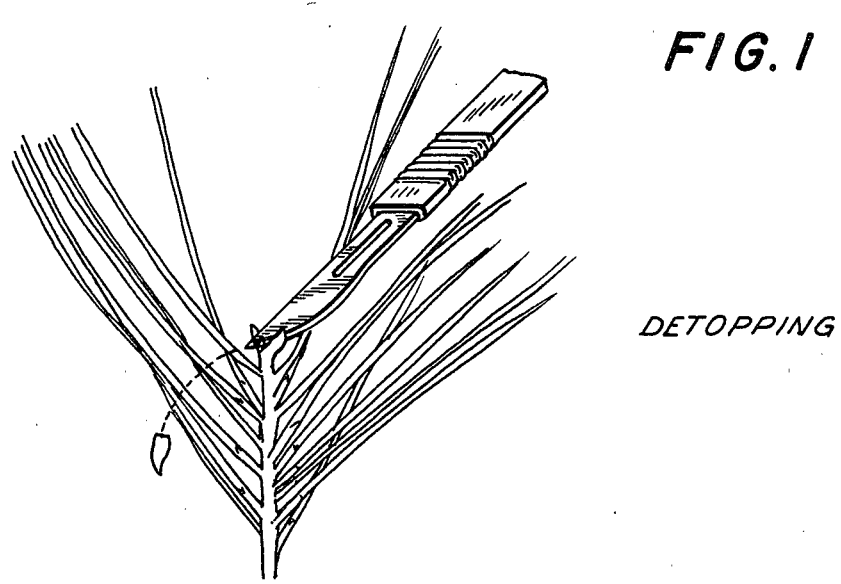
FIGS. 1, 2, and 3 are a pictorial representation of three steps—detopping, drenching and injection—usefully employed in this invention.

Referring now to FIG. 1, we have displayed in pictorial representation two steps—drenching and injection—useful in the process of this invention for contacting a stem of a selected tree stock with a solution cytokinins. Drenching, as used herein, refers to the contact of the terminal portion of the stem with a small amount of cytokinin solution (FIG. 1, middle, one embodiment). Injection, as used herein, refers to the injection into the xylem stream of the stem, preferably about 1 inch below the terminal bud, of a small amount of cytokinin solution (FIG. 1, bottom). Although not shown in FIG. 1, some drops of the injected solution may exude from one or both sides of the punctured stem during or subsequent to injection. While either of these means for contacting the stem with cytokinins may be used alone in the process of this invention, injection is the preferred method of contact and a combination of injection and drenching is the more preferred.

Most preferably, each of these steps is combined with a detopping step. Detopping, as used herein, refers to the pruning of the terminal buds from the main or lateral stems (FIG. 1, top, main stem). Again, even when detopping is also used, injection is the preferred means of contacting the stem with the cytokinins and a combination of injection and drenching is the more preferred. Therefore, in the most preferred embodiment of the process of this invention, detopping, injection and drenching are combined in one process. This combination gives the greatest percentage of needle fascicle activation.

The cytokinins useful in this invention include most cytokinins, e.g., 6-benzylaminopurine (BAP), kinetin (K) and 6-$\gamma$,$\gamma$-dimethylallylaminopurine (2iP). Most preferably, BAP is used. The amount of the cytokinin employed in the process of this invention depends on a number of factors such as the cytokinin or mixture employed (BAP appears to be useful in lower amounts than other cytokinins), the method of treatment (drenching requires more cytokinin than injection) and the development stage of the tree stock (older trees appear to require larger amounts of cytokinins). Usually, between 0.01 and 20 mg of cytokinin, and most preferably between 0.5 to 4 mg, are used to contact the terminal portion of the stem. For example, for a two- or three-year old loblolly pine, using BAP alone and injection as a means of contacting the stem with the cytokinin about 0.1±0.04 ml of a stock 5000-25000 mg BAP/l solution (0.5 to 2.5 mg BAP) were found to activate needle fascicles in accordance with this invention. And, 0.1±0.04 ml of a stock 10000 mg BAP/l solution (100 mg, 1.7 ml, 0.5 NaOH, and distilled water to (10 ml) (1 to 1.4 mg BAP) were the most preferred.

For drenching about 0.4 ml of similar BAP solutions (2 to 10 mg BAP) were found to be useful in accordance with this invention. Again, 0.4 ml of the stock 10000 mg BAP/l solution (4 mg BAP) were preferred. It is, of course, to be understood that those of skill in the art may determine other optimal amounts of cytokinins useful in the process of this invention depending on the factors enumerated above by simple tests (as described in the example to follow) without departing from the scope of this invention.

It should also be understood that the cytokinins of this invention need not be employed alone. They may, for example, also be combined with additional additives such as other plant hormones, for example, auxins, gibberellins or both. While the highest number of shoots was observed with BAP treatment alone, the other hormones may enhance subsequent shoot growth and rooting of the activated needle fascicles. For example, NAA greatly inhibited both shoot induction and shoot elongation, whereas $GA_{4/7}$ reduced the number of shoots formed, but did not influence their elongation.

Figure 2:
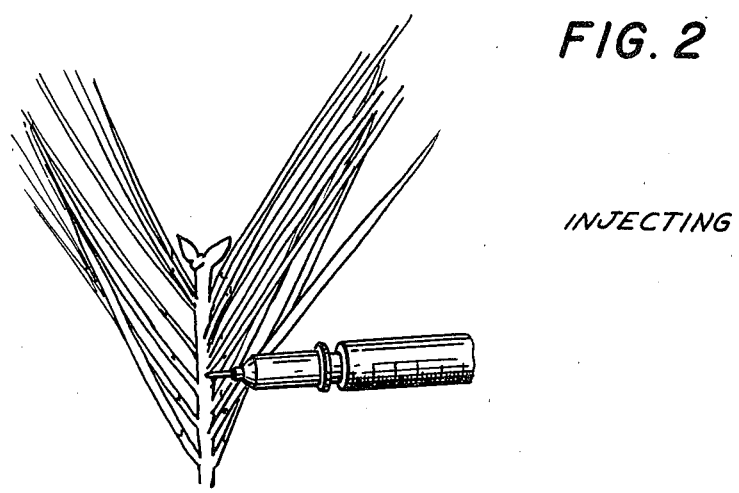
Figure 3:
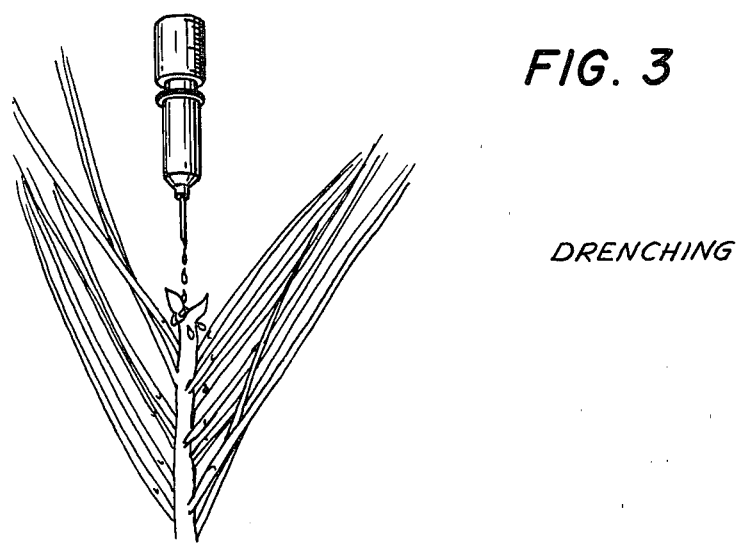
Figure 4:
FIG. 4 is a photograph of the in situ fascicle activation that results after 2-4 weeks from the process of this invention.
Figure 5:
FIG. 5 is a photograph of needle fascicles prepared in accordance with this invention two months after their transfer to a peat:perlite:vermiculite (2:2:3) soil mixture.

After contact of the stem, as described above, needle fascicle swelling was observed in two to four weeks (e.g., FIG. 2, top) and by eight to twelve weeks vigorously growing shoots were obtained, both above and below the injection point. Optimal needle fascicle activation response was obtained when the terminal bud was dormant, however, the difference was not a dramatic one. Moreover, there appears to be a pronounced seasonal influence on needle fascicle activation—the best response occurred when trees were treated in the spring, but only very few needle fascicles were activated when the treatments were made during the winter.

For rooting, the vigorously growing shoots (8–12 weeks after injection) were excised from the trees. The excised shoots should be "juvenile" shoots (more than 1 cm long and having mostly scale needles and no woody tissue). Mature-type shoots (in which needle fascicles have already formed) root at a lower frequency than juvenile shoots. Preferably, the shoot ends were then wetted with water and dipped into a rooting powder mix such as that described in [R. C. Hare, *XIII Southern Forest Tree Improvement Conference*, Raleigh, N.C., pp. 226-29 (1975)]. These shoots were then planted in soil and allowed to root (e.g., FIG. 2, bottom). Preferably, the shoots were misted for about 8 seconds every 12 minutes for root induction.

EXAMPLE

Two- to three-year old loblolly pine trees maintained in a growth room with a temperature of 22°±2° C., a photoperiod of 16 h light/8 h dark, light intensity of 300 ft cdls supplied by cool, white fluorescent light, and a relative humidity of 35–45% were used in this example as representative of gymnosperms. Trees having 30±5 needle fascicles in the upper two inches of the shoot region were selected for all experiments.

A series of BAP solutions was prepared by first dissolving the BAP in 0.5 N NaOH (heated mildly, if necessary) and then diluting the NaOH-BAP solution to 10 ml with distilled water. For example, to prepare 10 ml of BAP 10000 ml/l solution, 100 mg of BAP were dissolved in 1.7 ml 0.5 N NaOH, heated mildly, if necessary, and the solution diluted to 10 ml with distilled water.

The trees were contacted with the various BAP solutions by means of a sterile disposable tuberculin syringe. For injection, a hole was first made with the syringe needle by poking through the stem once or twice at the same hole. The BAP solution was then injected by withdrawing the needle halfway and applying pressure until all of the solution (0.1±0.04 ml) was injected (FIG. 1, bottom). In some cases, drops exuded from both sides of the injection hole during or subsequent to injection (not shown in FIG. 1). For drenching, the syringe was used to drop about 0.4 ml around the terminal portion of the stem.

The results of such series of treatments are displayed in Table I.

TABLE I

| BAP Concentration mg/l | Average Number of Needle Fascicles Swollen/Making Shoots | |
|---|---|---|
| | Injection (0.1 ml) | Injection (0.1 ml) + Drenching (0.4 ml) |
| Control | 0 | 0 |
| 100 | 2 | 9 |
| 500 | 3 | 18 |
| 1000 | 2 | 16 |
| 5000 | 16 | 20 |
| 10000 | 19 | 32 |
| 15000 | 19 | 27 |
| 25000 | 13 | 17 |

A similar series of experiments to display the use of other cytokinins, e.g., kinetin (K) and 6-γ,γ-dimethylallylaminopurine (2iP), in the process of this invention was conducted by contacting the tree stem with the appropriate cytokinin solution by injection (0.1 ml) and drenching (0.4 ml) (with or without detopping). The results are displayed in Table II.

TABLE II

| Cytokinin Concentration (mg/l) | Treatment | Average # of Needle Fascicles Swollen/Making Shoots |
|---|---|---|
| Control | Non-detopped | 0 |
| BAP 10,000 | Non-detopped | 24 |
| K 10,000 | Non-detopped | 12 |
| K 25,000 | Non-detopped | 7 |
| K 35,000 | Non-detopped | 15 |
| 2iP 10,000 | Non-detopped | 0 |
| 2iP 25,000 | Non-detopped | 9 |
| 2iP 35,000 | Non-detopped | 0 |
| Control | Detopped | 2 |
| BAP 10,000 | Detopped | 29 |
| K 35,000 | Detopped | 16 |
| 2iP 35,000 | Detopped | 6 |

Finally, a series of experiments to display the use of other plant hormones, e.g. auxins (α-naphthalene acetic acid (NAA)) and gibberellins ($GA_{4/7}$), in the processes of this invention. In this series of experiments, the stem was contacted with the appropriate solution by injection (0.1 ml) only. The results are displayed in Table III. Although the number of needle fascicles swollen or making shoots appears to decrease when growth hormones other than BAP are used or when other growth hormones are combined with BAP, the resulting activated fascicles, albeit fewer, may be more active in shoot formation and for rooting as a result of the additive growth hormones. For example, shoots activated with BAP-$GA_{4/7}$ had the highest percentage rooting.

TABLE III

| Growth Factor(s) Concentration (mg/l) | Average # of Needle Fascicles Swollen/ Making Shoots | Average Length (cm) of Shoots After 12 Weeks |
|---|---|---|
| Control | 0 | 0 |
| BAP 10,000 | 33 | 1.3 |
| $GA_{4/7}$ 400 | 0 | 0 |
| BAP 10,000 + $GA_{4/7}$ 400 | 14 | 1.2 |
| BAP 10,000 + $GA_{4/7}$ 1000 | 4 | 1.2 |
| BAP 10,000 + $GA_{4/7}$ 1000 + NAA 500 | 3 | 0.6 |

Other such series may, of course, be used by those of skill in the art, following the teachings of this invention, to select the optimal amounts of other cytokinins or cytokinins in combination with other additives usefully employed in the process of this invention.

In order to demonstrate the effect of the process of this invention on the activation of needle fascicles in the main stem and lateral stems, a series of BAP containing solutions was injected into the main stem as before. The results are displayed in Table IV.

TABLE IV

| BAP Concentration mg/l | Average Number of Needle Fascicles Swollen/Making Shoots | | |
|---|---|---|---|
| | Main Stem | Lateral Branches | Total |
| Control | 0 | 0 | 0 |
| 5,000 | 23 | 16 | 39 |
| 10,000 | 38 | 15 | 53 |
| 15,000 | 19 | 19 | 38 |
| 25,000 | 20 | 12 | 32 |

In order to demonstrate the effect of the two possible means—injection and drenching—of contacting the stem with cytokinins with or without detopping in accordance with this invention, a series of experiments using a 10,000 mg BAP/l solution, prepared as above, was carried out. The results are displayed in Table V.

TABLE V

| Treatment | Average # of Needle Fascicles Counted | Average # of Needle Fascicles Swollen/ Making Shoots | % of Needle Fascicles Swollen/ Making Shoots | Average Length (cm) of Shoots After 12 Weeks |
|---|---|---|---|---|
| Control | 36 | 0 | 0 | 0 |
| Detopped | 38 | 2 | 5 | 1.2 |
| Injected | 33 | 16 | 48 | 1.5 |
| Drenched | 32 | 7 | 22 | 1.4 |
| Injected + Detopped | 32 | 23 | 72 | 1.2 |
| Injected + Drenched | 36 | 29 | 80 | 1.4 |
| Drenched + Detopped | 38 | 14 | 37 | 0.9 |
| Injected + Drenched + Detopped | 38 | 37 | 97 | 1.7 |

To demonstrate the influence of different soil mixes on rooting of needle fascicles activated by the process of this invention, juvenile shoots (1 cm or longer) were excised from the trees 8–16 weeks after cytokinin treatment. The stem ends (of shoots excised after 12 weeks) were wetted with water, dipped into Hare's rooting powder mix [R. C. Hare (1975), supra] and planted in five different soil mixes. The planted shoots were then placed in an open mist bench supplied with a bottom heat cable at 75° F. in a greenhouse and the shoots misted for 8–10 seconds every 6 minutes. The shoots were checked for roots after 12 weeks. (A photograph of the shoots after 2 weeks is displayed in FIG. 2, bottom.) The results are displayed in Table VI.

TABLE VI

| Soil Mix | # of Shoots Planted | # of Shoots Rooted | % Shoots Rooted |
|---|---|---|---|
| 1 perlite:1 vermiculite | 17 | 5 | 29 |
| 2 peat:2 perlite:3 vermiculite | 18 | 9 | 50 |
| 1 peat:1 perlite:1 vermiculite | 19 | 5 | 26 |
| 1 peat:1 sand | 18 | 3 | 17 |
| 1 peat:1 vermiculite | 18 | 2 | 11 |

The above misting schedule may not be optimal for rooting. For example, further experiments have shown that high quality mist for about four weeks followed by a lower quality mist may improve the rooting of the shoots. Moreover, other rooting treatments such as the use of various phenolics, rooting powders and soil mixes and conditions of temperature, time and humidity may also enhance the rooting of needle fascicles activated by the processes of this invention.

Therefore, as demonstrated in the above example, the process of this invention permits the activation of needle fascicles under the influence of small amounts of cytokinins, results in a large number of shoots from such needle fascicles, provides shoots that elongate rapidly and permits rooting of those shoots to take place within two to three months after cytokinin treatment. Accordingly, the process permits the clonal propagation of gymnosperms and provides a high number of clones and seedlings for reforesting cut land.

While we have hereinbefore presented a number of embodiments of this invention, it is apparent that our basic construction can be altered to provide other embodiments which utilize the processes and compositions of this invention. Therefore, it will be appreciated that the scope of this invention is to be defined by the claims appended hereto rather than the specific embodiments which have been presented hereinbefore by way of example.

We claim:

1. A process for the in situ activation of normally dormant needle fascicles of gymnosperms to produce shoots, comprising the step of contacting the terminal portion of a stem of said gymnosperm with between about 0.01 to 20 mg of a cytokinin.

2. The process of claim 1 wherein said step of contacting is selected from the group consisting of injection, drenching and a combination thereof.

3. The process of claim 2 also including the step of detopping the terminal portion of said stem.

4. The process of claim 1 wherein said cytokinin is selected from the group consisting of 6-benzylaminopurine, kinetin, 6-γ,γ-dimethylallylaminopurine and combinations thereof.

5. The process of claim 1 wherein said cytokinin is combined with a plant hormone selected from the group consisting of auxins, gibberelins and combinations thereof.

6. The process of claim 1 wherein said gymnosperm is loblolly pine (*Pinus taeda*).

7. The process of claim 6 wherein said step of contacting is selected from the group consisting of injection, drenching and a combination thereof.

8. The process of claim 7 also including the step of detopping the terminal portion of said stem.

9. The process of claim 7 or 8 wherein said cytokinin is 6-benzylaminopurine.

10. The process of claim 9 wherein between about 1 to 5 mg of said 6-benzylaminopurine is employed.

11. A method of clonal propagation of gymnosperms comprising the steps of contacting the terminal portion of a stem of said gymnosperm with between about 0.01 to 20 mg of a cytokinin to activate the needle fascicles of said stem; allowing the activated needle fascicles to elongate into shoots; excising juvenile shoots from said stem; and rooting said shoots.

12. The process of claim 11 wherein said step of contacting is selected from the group consisting of injection, drenching and a combination thereof.

13. The process of claim 12 also including the step of detopping the terminal portion of said stem.

14. The process of claim 11 wherein said cytokinin is selected from the group consisting of 6-benzylaminopurine, kinetin, and 6-$\gamma,\gamma$-dimethylallylaminopurine and combinations thereof.

15. The process of claim 11 wherein said cytokinin is combined with a plant hormone selected from the group consisting of auxins, gibberelins and combinations thereof.

16. The process of claim 11 wherein said gymnosperm is loblolly pine (*Pinus taeda*).

17. The process of claim 16 wherein said step of contacting is selected from the group consisting of injection, drenching and a combination thereof.

18. The process of claim 17 also including the step of detopping the terminal portion of said stem.

19. The process of claim 17 or 18 wherein said cytokinin is 6-benzylaminopurine.

20. The process of claim 19 wherein between about 1 to 5 mg of said 6-benzylaminopurine is employed.

21. A gymnosperm clone produced by a process comprising the steps of contacting the terminal portion of a stem of said gymnosperm with between about 0.01 to 20 mg of a cytokinin to activate the needle fascicles of said stem; allowing the activated needle fascicles to elongate into shoots; excising the shoots from said stem; and rooting said shoots.

* * * * *